United States Patent
Tahara et al.

(10) Patent No.: US 12,456,576 B2
(45) Date of Patent: Oct. 28, 2025

(54) MULTILAYER CERAMIC CAPACITOR INCLUDING MONOTECTOID PHASE

(71) Applicant: Murata Manufacturing Co., Ltd., Nagaokakyo (JP)

(72) Inventors: Retsu Tahara, Nagaokakyo (JP); Taeko Mishiro, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 80 days.

(21) Appl. No.: 18/410,054

(22) Filed: Jan. 11, 2024

(65) Prior Publication Data
US 2024/0242889 A1    Jul. 18, 2024

(30) Foreign Application Priority Data
Jan. 17, 2023  (JP) ................. 2023-004965

(51) Int. Cl.
*H01G 2/24* (2006.01)
*H01G 4/12* (2006.01)
*H01G 4/224* (2006.01)
*H01G 4/232* (2006.01)
*H01G 4/30* (2006.01)

(52) U.S. Cl.
CPC ............ *H01G 2/24* (2013.01); *H01G 4/1236* (2013.01); *H01G 4/224* (2013.01); *H01G 4/232* (2013.01); *H01G 4/30* (2013.01)

(58) Field of Classification Search
None
See application file for complete search history.

(56) References Cited

U.S. PATENT DOCUMENTS

| | | | |
|---|---|---|---|
| 2014/0083755 A1* | 3/2014 | Lee ................ | H05K 1/181 338/21 |
| 2016/0003737 A1* | 1/2016 | Shimada ........... | G01N 21/64 414/816 |
| 2020/0058445 A1* | 2/2020 | Lee ................ | H05K 1/181 |
| 2023/0207210 A1* | 6/2023 | Lee ................ | H01G 4/30 361/301.4 |

FOREIGN PATENT DOCUMENTS

JP          08-306580 A      11/1996

* cited by examiner

Primary Examiner — Eric W Thomas
(74) Attorney, Agent, or Firm — Keating & Bennett, LLP

(57) ABSTRACT

A multilayer ceramic capacitor includes a multilayer body including dielectric layers. A difference between an RGB value which reproduces a color tone of ends in a width direction y of a first and second main-surface-side outer layer portions of the multilayer body and an RGB value which reproduces a color tone of ends in the width direction of a first and second side-surface-side outer layer portions is not smaller than about 45 and not larger than about 100, a monotectoid phase is provided in the first and second side-surface-side outer layer portions in a WT cross-section, includes at least one of Ca and Si, and a region where the monotectoid phase is provided is not larger than about 3% of a total area of the first and second side-surface-side outer layer portions in the WT cross-section of the multilayer body.

16 Claims, 4 Drawing Sheets

MULTILAYER CERAMIC CAPACITOR INCLUDING MONOTECTOID PHASE

CROSS REFERENCE TO RELATED APPLICATIONS

This nonprovisional application is based on Japanese Patent Application No. 2023-004965 filed with the Japan Patent Office on Jan. 17, 2023, the entire contents of which are hereby incorporated by reference.

BACKGROUND OF THE INVENTION

1. Field of the Invention

The present invention relates to multilayer ceramic capacitors.

2. Description of the Related Art

A multilayer ceramic capacitor has conventionally been known. In general, the multilayer ceramic capacitor includes a ceramic sintered material made of dielectric ceramic such as barium titanate. In the inside of this ceramic sintered material, a plurality of internal electrodes are arranged as being overlaid on each other, with ceramic layers being interposed therebetween. On each of one end surface and the other end surface of this ceramic sintered material, an external electrode is formed to electrically be connected to the internal electrodes (see, for example, Japanese Patent Laid-Open No. 8-306580).

The conventional multilayer ceramic capacitor, however, is disadvantageous as described below. Specifically, the ceramic sintered material which is a multilayer body including a plurality of ceramic layers has a parallelepiped outer shape, and it is difficult to externally distinguish between a main surface and a side surface which are surfaces other than the end surfaces where the external electrodes are formed. This difficulty leads, for example, to difficulty in distinguishing whether the multilayer ceramic capacitor on a transport surface shows a main surface or a side surface in a process of transport of the multilayer ceramic capacitor and to subsequent lowering in efficiency in appearance-based screening or mounting. Furthermore, the conventional multilayer ceramic capacitor has not been sufficient in high-temperature reliability.

SUMMARY OF THE INVENTION

Example embodiments of the present invention provide multilayer ceramic capacitors that each facilitate distinguishing an orientation of a multilayer ceramic capacitor and improving high-temperature reliability.

A multilayer ceramic capacitor according to an example embodiment of the present invention includes a multilayer body including a plurality of dielectric layers stacked in a stacking direction and a plurality of internal electrode layers on the dielectric layers, the multilayer body including a first main surface and a second main surface opposed to each other in a stacking direction, a first side surface and a second side surface opposed to each other in a width direction orthogonal or substantially orthogonal to the stacking direction, and a first end surface and a second end surface opposed to each other in a length direction orthogonal or substantially orthogonal to the stacking direction and the width direction, a first external electrode on the first end surface, and a second external electrode on the second end surface. The multilayer body includes an inner layer portion in which the plurality of dielectric layers and the plurality of internal electrode layers are alternately stacked, a first main-surface-side outer layer portion and a second main-surface-side outer layer portion sandwiching the inner layer portion from a side of the first main surface and a side of the second main surface, and a first side-surface-side outer layer portion and a second side-surface-side outer layer portion sandwiching the inner layer portion from a side of the first side surface and a side of the second side surface. A difference between an RGB value that reproduces a color tone of ends in the width direction of the first main-surface-side outer layer portion and the second main-surface-side outer layer portion and an RGB value that reproduces a color tone of ends in the width direction of the first side-surface-side outer layer portion and the second side-surface-side outer layer portion is not smaller than about 45 and not larger than about 100. The dielectric layer includes a ceramic material. A monotectoid phase is provided in the first side-surface-side outer layer portion and the second side-surface-side outer layer portion in a WT cross-section defined by the stacking direction and the width direction of the multilayer body. The monotectoid phase includes at least one of Ca and Si. A region where the monotectoid phase is provided is not larger than about 3% of a total area of the first side-surface-side outer layer portion and the second side-surface-side outer layer portion in the WI cross-section of the multilayer body.

According to example embodiments of the present invention, multilayer ceramic capacitors that each facilitate distinguishing between a main surface and a side surface and improving high-temperature reliability are able to be provided.

The above and other elements, features, steps, characteristics and advantages of the present invention will become more apparent from the following detailed description of the example embodiments with reference to the attached drawings.

DESCRIPTION OF THE EXAMPLE EMBODIMENTS

Example embodiments of the present invention will be described below with reference to the drawings.

1. Multilayer Ceramic Capacitor

An exemplary multilayer ceramic capacitor according to an example embodiment of the present invention will be described.

Figure 1:
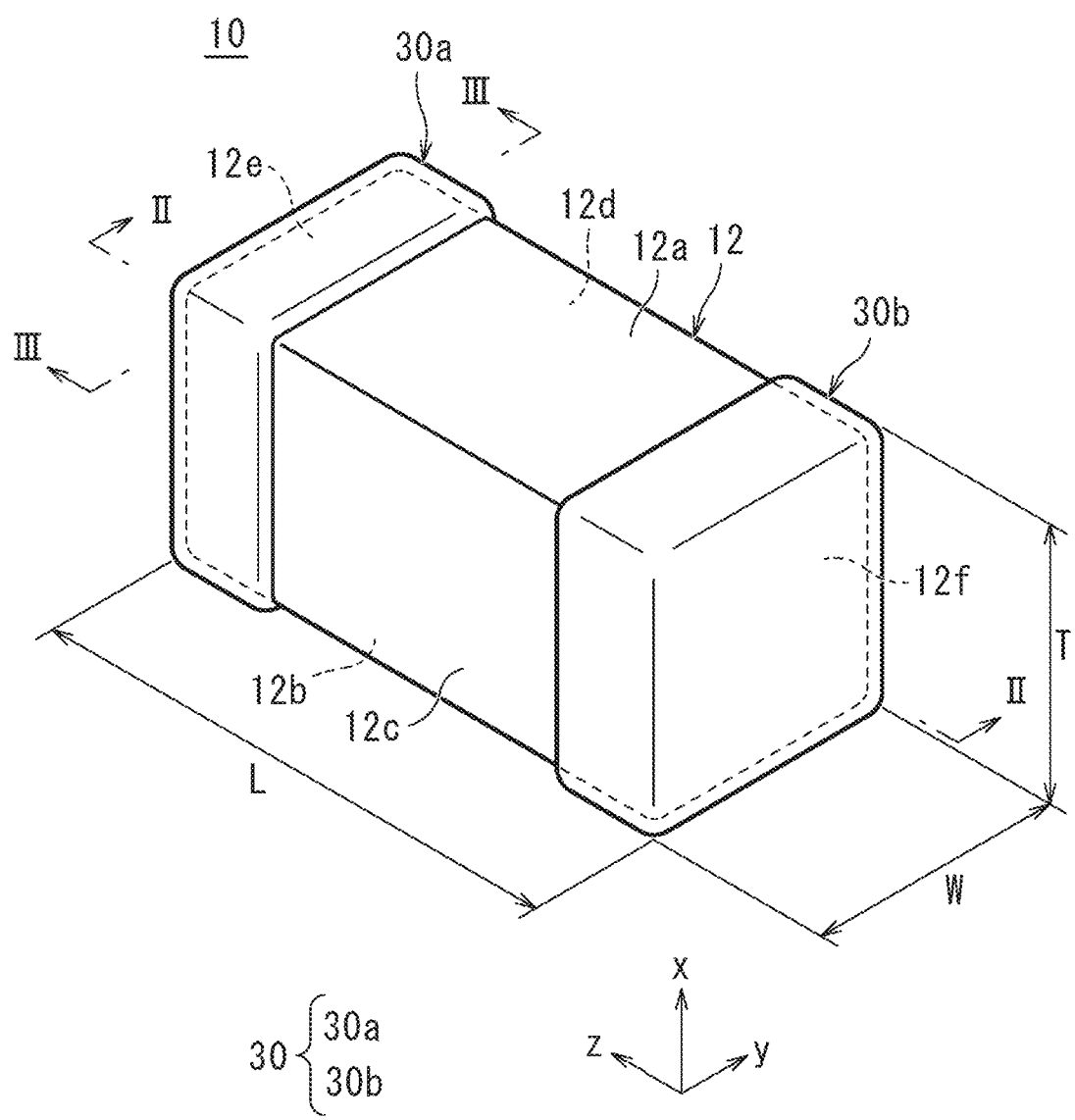
FIG. 1 is an external perspective view showing a multilayer ceramic capacitor according to an example embodiment of the present invention.
Figure 2:
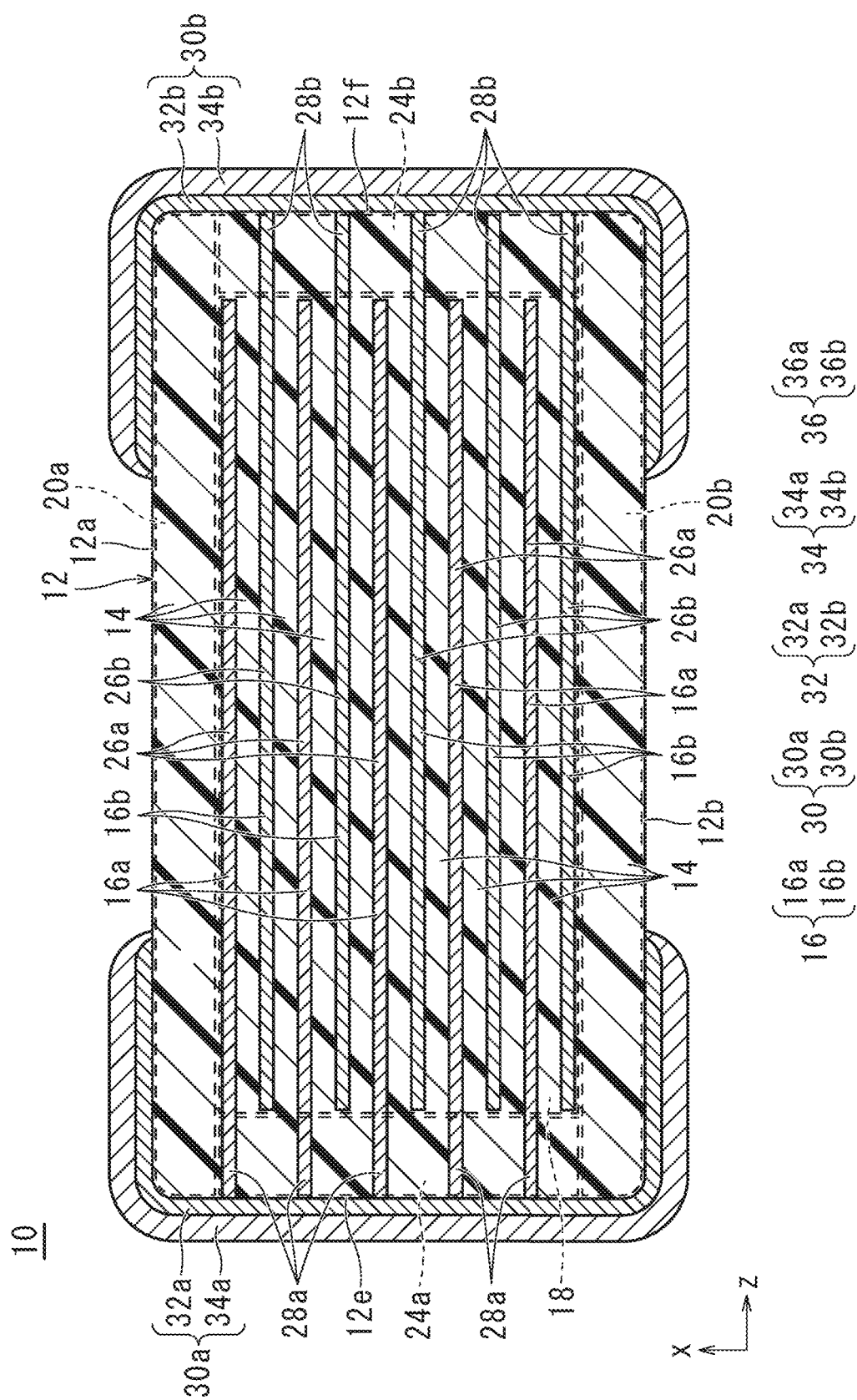
FIG. 2 is a cross-sectional view along the line II-II in FIG. 1.
Figure 3:
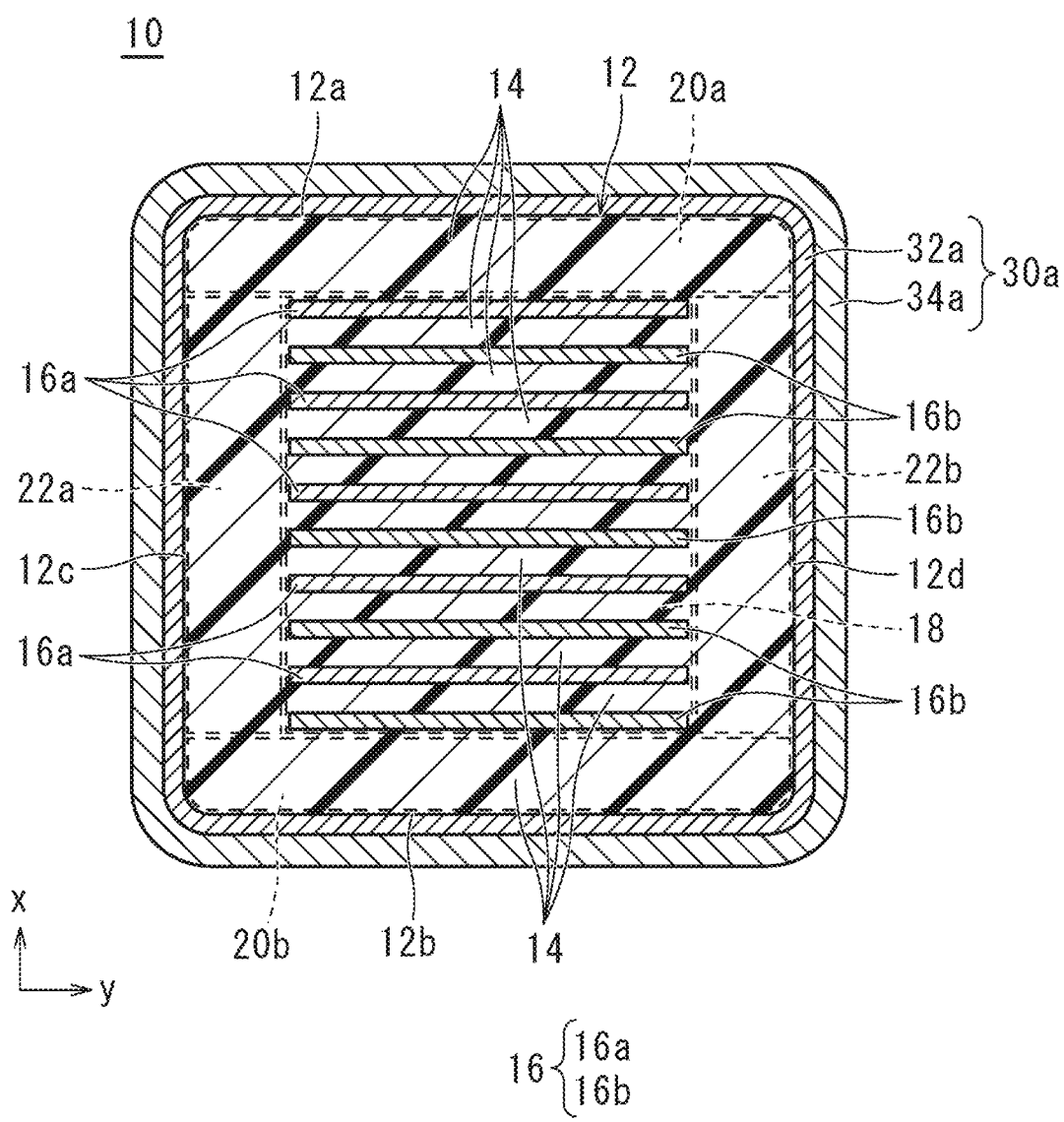
FIG. 3 is a cross-sectional view along the line III-III in FIG. 1.

FIG. 1 is an external perspective view showing a multilayer ceramic capacitor which is an exemplary multilayer ceramic capacitor according to an example embodiment of the present invention. FIG. 2 is a cross-sectional view along the line II-II in FIG. 1. FIG. 3 is a cross-sectional view along the line III-III in FIG. 1.

A multilayer ceramic capacitor 10 includes a multilayer body 12, for example, having a parallelepiped shape as shown in FIGS. 1 to 3. Multilayer body 12 includes a plurality of layered dielectric layers 14 and a plurality of internal electrode layers 16. Furthermore, multilayer body 12 includes a first main surface 12a and a second main surface 12b opposed to each other in a stacking direction x, a first side surface 12c and a second side surface 12d opposed to each other in a width direction y orthogonal or substantially orthogonal to stacking direction x, and a first end surface 12e and a second end surface 12f opposed to each other in a length direction z orthogonal or substantially orthogonal to stacking direction x and width direction y. This multilayer body 12 preferably includes a corner portion and a ridgeline portion that are rounded. The corner portion refers to a portion where three adjacent surfaces of multilayer body 12 meet one another and the ridgeline portion refers to a portion where two adjacent surfaces of multilayer body 12 meet each other.

Projections and recesses or the like may be provided in a portion or the entirety of first main surface 12a and second main surface 12b, first side surface 12c and second side surface 12d, and first end surface 12e and second end surface 12f.

Multilayer body 12 includes an inner layer portion 18 including one dielectric layer 14 or a plurality of dielectric layers 14 and a plurality of internal electrode layers 16 provided thereon. Internal electrode layers 16 include a first internal electrode layer 16a extending to first end surface 12e and a second internal electrode layer 16b extending to second end surface 12f. In inner layer portion 18, first internal electrode layer 16a and second internal electrode layer 16b are opposed to each other with dielectric layer (s) 14 being interposed therebetween.

Multilayer body 12 includes a first main-surface-side outer layer portion 20a located on a side of first main surface 12a and including a plurality of dielectric layers 14 located between first main surface 12a and an outermost surface of inner layer portion 18 on the side of first main surface 12a and a virtual extension of the outermost surface.

Similarly, multilayer body 12 includes a second main-surface-side outer layer portion 20b located on a side of second main surface 12b and including a plurality of dielectric layers 14 located between second main surface 12b and an outermost surface of inner layer portion 18 on the side of second main surface 12b and a virtual extension of the outermost surface.

Multilayer body 12 includes a first side-surface-side outer layer portion 22a located on a side of first side surface 12c and including a plurality of dielectric layers 14 located between first side surface 12c and an outermost surface of inner layer portion 18 on the side of first side surface 12c.

Similarly, multilayer body 12 includes a second side-surface-side outer layer portion 22b located on a side of second side surface 12d and including a plurality of dielectric layers 14 located between second side surface 12d and an outermost surface of inner layer portion 18 on the side of second side surface 12d.

Multilayer body 12 includes a first end-surface-side outer layer portion 24a located on a side of first end surface 12e and including a plurality of dielectric layers 14 located between first end surface 12e and an outermost surface of inner layer portion 18 on the side of first end surface 12e.

Similarly, multilayer body 12 includes a second end-surface-side outer layer portion 24b located on a side of second end surface 12f and including a plurality of dielectric layers 14 located between second end surface 12f and an outermost surface of inner layer portion 18 on the side of second end surface 12f.

First main-surface-side outer layer portion 20a is an assembly of the plurality of dielectric layers 14 located on the side of first main surface 12a of multilayer body 12 and located between first main surface 12a and internal electrode layer 16 closest to first main surface 12a.

Second main-surface-side outer layer portion 20b is an assembly of the plurality of dielectric layers 14 located on the side of second main surface 12b of multilayer body 12 and located between second main surface 12b and internal electrode layer 16 closest to second main surface 12b.

A compound in a perovskite structure including, for example, Zr and Ca is used as a dielectric material of dielectric layer 14 of multilayer body 12. Examples of such a dielectric material of dielectric layer 14 of multilayer body 12 include $SrBaZrO_3$.

In particular, for example, the dielectric material of dielectric layer 14 included in first side-surface-side outer layer portion 22a and second side-surface-side outer layer portion 22b of multilayer body 12 is the compound in the perovskite structure including Zr and Ca, and further including at least one of Ca and Si for a monotectoid phase which will be described later.

Figure 4:
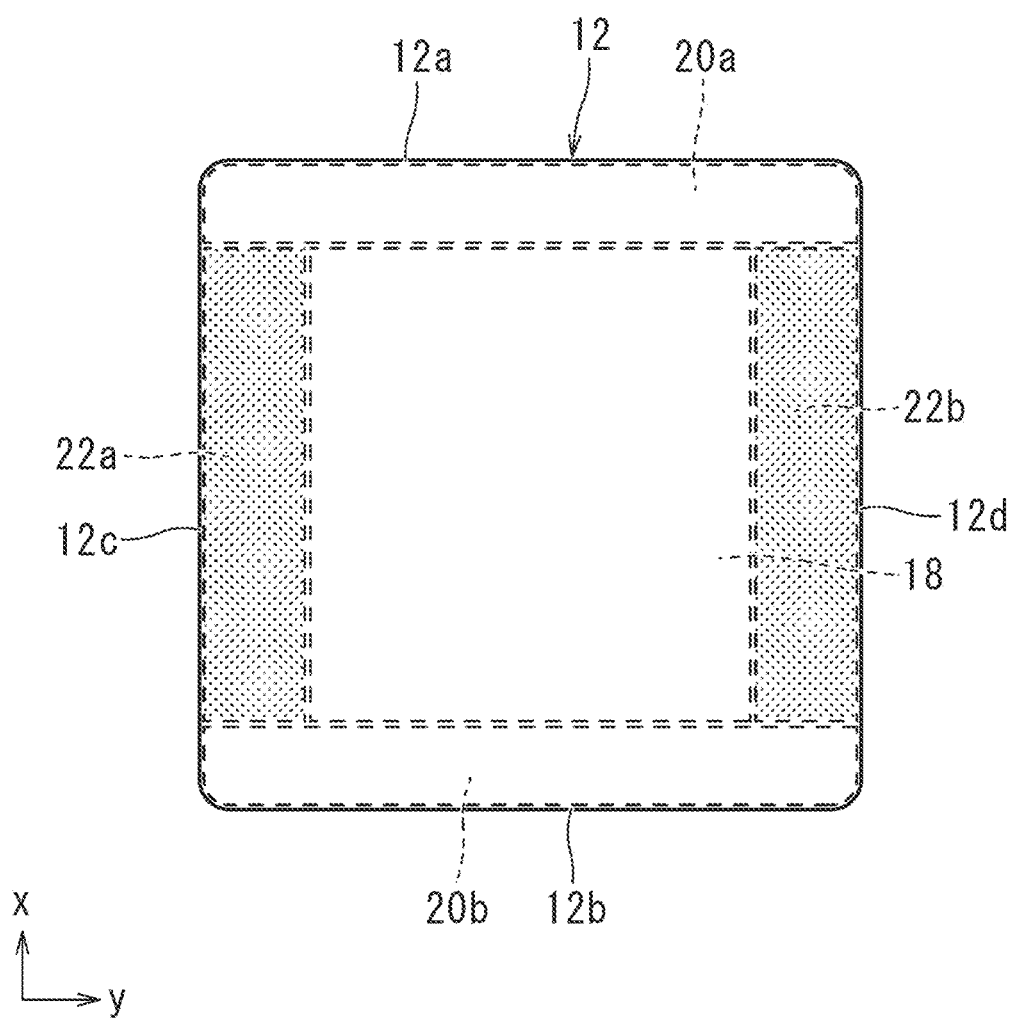
FIG. 4 is a cross-sectional view schematically showing the structure of the multilayer ceramic capacitor according to the example embodiment of the present invention.

For example, as shown in FIG. 4, in multilayer body 12, a difference between an RGB value that reproduces a color tone (a white portion in the figure) of ends in width direction y of first main-surface-side outer layer portion 20a and second main-surface-side outer layer portion 20b and an RGB value that reproduces a color tone of ends of at least both of side surface sides 12c and 12d in width direction y of first side-surface-side outer layer portion 22a and second side-surface-side outer layer portion 22b is not smaller than about 45 and not larger than about 100.

In multilayer body 12, the monotectoid phase is arranged in first side-surface-side outer layer portion 22a and second side-surface-side outer layer portion 22b in a WT cross-section defined by stacking direction x and width direction y. The monotectoid phase includes, for example, at least one of Ca and Si. A region where the monotectoid phase is arranged is not larger than about 3% of a total area of first side-surface-side outer layer portion 22a and second side-surface-side outer layer portion 22b in the WT cross-section of multilayer body 12.

When the difference between the RGB value that reproduces the color tone of the ends in width direction y of first main-surface-side outer layer portion 20a and second main-surface-side outer layer portion 20b and the RGB value that reproduces the color tone of the ends in width direction y of first side-surface-side outer layer portion 22a and second side-surface-side outer layer portion 22b is smaller than about 45, the difference in color tone is small and distinguishability in appearance-based screening or mountability is reduced. When this difference between the RGB values is larger than about 100, a difference in shrinkage at the time of firing at the ends in width direction y of first main-surface-side outer layer portion 20a and second main-surface-side outer layer portion 20b and the ends in width direction y of first side-surface-side outer layer portion 22a and second side-surface-side outer layer portion 22b is large, which leads to structural defects.

When the region where the monotectoid phase is arranged is larger than about 3% of the total area of first side-surfaceside outer layer portion 22a and second side-surface-side outer layer portion 22b in the WI cross-section of multilayer body 12, high-temperature reliability is reduced.

For example, a microscope (Keyence VHX-5000) is used to measure the difference in RGB value (difference in color tone) between the ends in width direction y of first main-surface-side outer layer portion 20a and second main-surface-side outer layer portion 20b and the ends in width direction y of first side-surface-side outer layer portion 22a and second side-surface-side outer layer portion 22b. The RGB value is measured by analysis with image analysis software, of an image (the ends in width direction y of first main-surface-side outer layer portion 20a and second main-surface-side outer layer portion 20b and the ends in width direction y of first side-surface-side outer layer portion 22a and second side-surface-side outer layer portion 22b) observed with the microscope.

For example, a wavelength dispersive X-ray fluorescence spectrometer is used to measure the monotectoid phase. In this spectrometer, fluorescence X-rays emitted from a sample irradiated with X-rays are separated by a spectroscopic element and thereafter detected by a detector. A relationship of 2d sin θ=nλ (n: a positive integer) is satisfied (Bragg's (condition), where A represents a wavelength of fluorescence X-rays, d represents spacing of the spectroscopic element, and 2θ represents a spectral angle of fluorescence X-rays through the spectroscopic element.

Wavelength λ of fluorescence X-rays has a specific value in correspondence with an element in a sample. Therefore, when spacing d of the spectroscopic element has already been known, spectral angle 2θ of fluorescence X-rays can also be determined as a value determined for each element.

Therefore, when scanning is performed while a relationship based on spectral angle 2θ is maintained between the spectroscopic element and the detector, fluorescence X-rays detected by the detector have an intensity peak at spectral angle 2θ specific to the element in the sample, and therefore a type of the element in the sample can be identified. When the type of the element in the sample has already been known, a content of the element in the sample can be measured by measurement of the intensity of fluorescence X-rays at spectral angle 2θ corresponding to the wavelength specific to the element that has already been known. The element in the monotectoid phase is thus identified and quantified.

Multilayer body 12 includes a plurality of first internal electrode layers 16a and a plurality of second internal electrode layers 16b, for example, having a rectangular or substantially rectangular shape as the plurality of internal electrode layers 16. The plurality of first internal electrode layers 16a and the plurality of second internal electrode layers 16b are alternately arranged at regular intervals with dielectric layers 14 interposed therebetween along stacking direction x of multilayer body 12.

First internal electrode layer 16a is provided on the plurality of dielectric layers 14 and located in the inside of multilayer body 12. First internal electrode layer 16a includes a first opposing electrode portion 26a opposed to second internal electrode layer 16b and a first drawn electrode portion 28a located on one end side of first internal electrode layer 16a and extending from first opposing electrode portion 26a to first end surface 12e of multilayer body 12. First drawn electrode portion 28a includes an end at the surface of first end surface 12e and exposed to the outside of multilayer body 12.

Although a shape of first opposing electrode portion 26a of first internal electrode layer 16a is not particularly limited, it is preferably, for example, rectangular or substantially rectangular in a plan view. The corner portion may be rounded or beveled (tapered) in the plan view. The corner portion may be tapered as being inclined in any direction in the plan view.

Although the shape of first drawn electrode portion 28a of first internal electrode layer 16a is not particularly limited, it is preferably, for example, rectangular or substantially rectangular in the plan view. The corner portion may be rounded or beveled (tapered) in the plan view. The corner portion may be tapered as being inclined in any direction in the plan view.

A width of first opposing electrode portion 26a of first internal electrode layer 16a may be the same or substantially the same as a width of first drawn electrode portion 28a of first internal electrode layer 16a, or one of the widths may be smaller.

Second internal electrode layer 16b is provided on the plurality of dielectric layers 14 and located in the inside of multilayer body 12. Second internal electrode layer 16b includes a second opposing electrode portion 26b opposed to first internal electrode layer 16a and a second drawn electrode portion 28b located on one end side of second internal electrode layer 16b and extending from second opposing electrode portion 26b to second end surface 12f of multilayer body 12. Second drawn electrode portion 28b includes an end at the surface of second end surface 12f and exposed to the outside of multilayer body 12.

Although the shape of second opposing electrode portion 26b of second internal electrode layer 16b is not particularly limited, it is preferably, for example, rectangular or substantially rectangular in the plan view. The corner portion may be rounded or beveled (tapered) in the plan view. The corner portion may be tapered as being inclined in any direction in the plan view.

Although the shape of second drawn electrode portion 28b of second internal electrode layer 16b is not particularly limited, it is preferably, for example, rectangular or substantially rectangular in the plan view. The corner portion may be rounded or beveled (tapered) in the plan view. The corner portion may be tapered as being inclined in any direction in the plan view.

A width of second opposing electrode portion 26b of second internal electrode layer 16b may be the same or substantially the same as a width of second drawn electrode portion 28b of second internal electrode layer 16b, or one of the widths may be smaller.

First internal electrode layer 16a and second internal electrode layer 16b can be made, for example, of an appropriate conductive material such as metal such as Ni, Cu, Ag, Pd, and Au and an alloy including at least one of these metals such as an Ag—Pd alloy.

As shown in FIGS. 1 to 3, an external electrode 30 is provided on the side of each of first end surface 12e and second end surface 12f of multilayer body 12.

External electrode 30 includes a first external electrode 30a and a second external electrode 30b.

First external electrode 30a is connected to first internal electrode layers 16a and provided at least on the surface of first end surface 12e.

First external electrode 30a may also be provided on a portion of first main surface 12a and a portion of second main surface 12b of multilayer body 12 and on a portion of first side surface 12c and a portion of second side surface 12d. In the present example embodiment, first external electrode 30a extends from first end surface 12e to a portion of first main surface 12a and a portion of second main surface 12b and a portion of first side surface 12c and a portion of second side surface 12d. In this case, first external electrode 30a is electrically connected to first drawn electrode portions 28a of first internal electrode layers 16a.

Second external electrode 30b is connected to second internal electrode layers 16b and provided at least on a surface of second end surface 12f.

Second external electrode 30b may also be provided on a portion of first main surface 12a and a portion of second main surface 12b of multilayer body 12 and on a portion of first side surface 12c and a portion of second side surface 12d. In the present example embodiment, second external electrode 30b extends from second end surface 12f to a portion of first main surface 12a and a portion of second main surface 12b and a portion of first side surface 12c and a portion of second side surface 12d. In this case, second external electrode 30b is electrically connected to second drawn electrode portions 28b of second internal electrode layers 16b.

In multilayer body 12, a capacitance is generated by first opposing electrode portion 26a of first internal electrode layer 16a being opposed to second opposing electrode portion 26b of second internal electrode layer 16b with dielectric layer 14 being interposed. Therefore, the capacitance can be obtained between first external electrode 30a connected to first internal electrode layers 16a and second external electrode 30b connected to second internal electrode layers 16b and characteristics of the capacitor are provided.

External electrode 30 preferably includes an underlying electrode layer 32 provided on each of first end surface 12e and second end surface 12f and a plated layer 34 provided on a surface of underlying electrode layer 32.

Underlying electrode layer 32 includes a first underlying electrode layer 32a and a second underlying electrode layer 32b.

First underlying electrode layer 32a is connected to first internal electrode layers 16a and provided on the surface of first end surface 12e. First underlying electrode layer 32a extends from first end surface 12e and is also provided on a portion of first main surface 12a and a portion of second main surface 12b and a portion of first side surface 12c and a portion of second side surface 12d. In this case, first underlying electrode layer 32a is electrically connected to first drawn electrode portions 28a of first internal electrode layers 16a.

Second underlying electrode layer 32b is connected to second internal electrode layers 16b and provided on the surface of second end surface 12f. Second underlying electrode layer 32b extends from second end surface 12f and is also provided on a portion of first main surface 12a and a portion of second main surface 12b and a portion of first side surface 12c and a portion of second side surface 12d. In this case, second underlying electrode layer 32b is electrically connected to second drawn electrode portions 28b of second internal electrode layers 16b.

Underlying electrode layer 32 includes at least one selected from, for example, a baked layer, a conductive resin layer, a thin-film layer, and the like.

A construction in each of examples where underlying electrode layer 32 is the baked layer, the conductive resin layer, and the thin-film layer will be described below.

Example of Baked Layer

The baked layer includes, for example, glass and metal. Glass for the baked layer includes, for example, at least one of B, Si, Ba, Sr, Ca, Mg, Al, Ti, Zr, K, Na, L, and the like. A metallic component of the baked layer includes, for example, at least one selected from Cu, Ni, Ag, Pd, an Ag—Pd alloy, Au, and the like.

A plurality of baked layers may be provided.

The baked layer may be obtained by applying a conductive paste including glass and metal to multilayer body 12 and baking the multilayer body, and it may be fired simultaneously with internal electrode layers 16 or may be baked after internal electrode layers 16 are fired.

The baked layer has a thickness preferably, for example, not smaller than about 10 µm and not larger than about 150 µm.

When underlying electrode layer 32 is provided on first main surface 12a and second main surface 12b and first side surface 12c and second side surface 12d, a first baked layer and a second baked layer in a central portion in length direction z which will be first underlying electrode layer 32a and second underlying electrode layer 32b located on first main surface 12a and second main surface 12b and first side surface 12c and second side surface 12d each have a thickness, for example, preferably not smaller than about 10 µm and not larger than about 100 µm.

Example of Conductive Resin Layer

The conductive resin layer includes a first conductive resin layer and a second conductive resin layer.

The first conductive resin layer covers first underlying electrode layer 32a and the second conductive resin layer covers second underlying electrode layer 32b. Specifically, preferably, the first conductive resin layer and the second conductive resin layer are provided on first underlying electrode layer 32a and second underlying electrode layer 32b located on first end surface 12e and second end surface 12f and provided to also extend to first underlying electrode layer 32a and second underlying electrode layer 32b located on first main surface 12a and second main surface 12b and first side surface 12c and second side surface 12d. The first conductive resin layer and the second conductive resin layer may be provided only on first underlying electrode layer 32a and second underlying electrode layer 32b located on first end surface 12e.

The first conductive resin layer and the second conductive resin layer each preferably have a thickness of, for example, not smaller than about 10 µm and not larger than about 200 µm.

The first conductive resin layer and the second conductive resin layer each include, for example, a thermosetting resin and a metallic component.

Since the first conductive resin layer and the second conductive resin layer include the thermosetting resin, they are more flexible than underlying electrode layer 32 made, for example, of a plated film or a fired conductive paste. Therefore, even when a physical impact or an impact originating from a thermal cycle is applied to multilayer ceramic capacitor 10, the conductive resin layer can define and function as a buffer layer to prevent cracking of multilayer ceramic capacitor 10.

Specific examples of the thermosetting resin include various known thermosetting resins such as an epoxy resin, a phenol resin, a urethane resin, a silicone resin, and a polyimide resin. Among these, the epoxy resin having excellent heat resistance, moisture resistance, and adhesiveness is one of more appropriate resins.

The first conductive resin layer and the second conductive resin layer preferably include a curing agent together with the thermosetting resin. When the epoxy resin is used as a base resin, various known compounds such as, for example, a phenol-based compound, an amine-based compound, an acid-anhydride-based compound, and an imidazole-based compound can be used as the curing agent for the epoxy resin.

Ag, Cu, or an alloy thereof can be used, for example, as the metallic component to be included in the first conductive resin layer and the second conductive resin layer. In addition, a material obtained by coating surfaces of metallic powders with Ag can be used. When the material obtained by coating the surfaces of the metallic powders with Ag is used, for example, Cu or Ni is preferably used as metallic powders.

A material obtained by subjecting Cu to antioxidant treatment can also be used. The reason why Ag-coated metal is used is that an inexpensive metal can be used as the base material while characteristics of Ag are maintained.

Preferably, for example, metal not lower than about 35 vol % and not higher than about 75 vol % with respect to a volume of the whole conductive resin is included in the first conductive resin layer and the second conductive resin layer.

A shape of metal to be included in the first conductive resin layer and the second conductive resin layer is not particularly limited. A conductive filler may be spherical or have a flat profile.

An average particle size of metal to be included in the first conductive resin layer and the second conductive resin layer is not particularly limited. The conductive filler may have an average particle size of, for example, not smaller than about 0.3 μm and not larger than about 10 μm.

Metal included in the first conductive resin layer and the second conductive resin layer mainly provides electrical conduction through the conductive resin layer. Specifically, contact between conductive fillers forms an electrical conduction path in the inside of the conductive resin layer.

Although metal in a spherical shape or having a flat profile can be included in the first conductive resin layer and the second conductive resin layer, metallic powders in the spherical shape and metallic powders having the flat profile are preferably used as being mixed.

The conductive resin layer may include a resin layer including conductive particles and a thermosetting resin. When the resin layer is formed, it may be formed directly on multilayer body 12 without the baked layer being formed.

Example of Plated Layer

Plated layer 34 includes a first plated layer 34a and a second plated layer 34b.

Plated layer 34 covers the conductive resin layer. Specifically, preferably, first plated layer 34a and second plated layer 34b are provided on the conductive resin layer on first end surface 12e and second end surface 12f and also extend to the conductive resin layer on first main surface 12a and second main surface 12b and first side surface 12c and second side surface 12d. First plated layer 34a and second plated layer 34b may be provided on the conductive resin layer only on first end surface 12e and second end surface 12f.

Plated layer 34 includes, for example, at least one selected from Cu, Ni, Ag, Pd, an Ag—Pd alloy, Au, and the like.

Plated layer 34 may include a plurality of layers. Preferably, for example, the plated layer has a two-layered structure of Ni plating and Sn plating. By providing the plated layer including Ni plating to cover the conductive resin layer, erosion of the underlying electrode layer or the conductive resin layer by solder used for mount in mount of multilayer ceramic capacitor 10 can be prevented. By providing the plated layer including an Sn plated layer further on the plated layer including the Ni plated layer, wettability with solder used for mount in mount of multilayer ceramic capacitor 10 can be improved and the multilayer ceramic capacitor is readily mounted.

The Ni plated layer preferably has a thickness of, for example, not smaller than about 1 μm and not larger than about 15 μm.

The Sn plated layer preferably has a thickness of, for example, not smaller than about 1 μm and not larger than about 15 μm.

A dimension in length direction z of multilayer ceramic capacitor 10 is denoted as an L dimension, a dimension in stacking direction x of multilayer ceramic capacitor 10 is denoted as a T dimension, and a dimension in width direction y of multilayer ceramic capacitor 10 is denoted as a W dimension.

For example, multilayer ceramic capacitor 10 has the L dimension in length direction z not smaller than about 0.2 mm and not larger than about 3.6 mm, the W dimension in width direction y not smaller than about 0.1 mm and not larger than about 2.6 mm, and the T dimension in stacking direction x not smaller than about 0.1 mm and not larger than about 2.6 mm.

The dimension of multilayer ceramic capacitor 10 can be measured with a microscope.

In multilayer ceramic capacitor 10 shown in FIG. 1, a difference between the RGB value that reproduces the color tone of the ends in width direction y of first main-surface-side outer layer portion 20a and second main-surface-side outer layer portion 20b of multilayer body 12 and the RGB value that reproduces the color tone of the ends in width direction y of first side-surface-side outer layer portion 22a and second side-surface-side outer layer portion 22b is not smaller than about 45 and not larger than about 100, for example, the monotectoid phase is provided in first side-surface-side outer layer portion 22a and second side-surface-side outer layer portion 22b in the WT cross-section defined by stacking direction x and width direction y of multilayer body 12, the monotectoid phase includes, for example, at least one of Ca and Si, and the region where the monotectoid phase is provided is not larger than, for example, about 3% of the total area of first side-surface-side outer layer portion 22a and second side-surface-side outer layer portion 22b in the WT cross-section of the multilayer body. Therefore, a distinction between the main surface and the side surface can be facilitated, a distinction of the orientation of the multilayer ceramic capacitor can be made, an appearance-based screening or designation of a direction in mount can be made, an appearance-based screening or mount can be more efficient, and an amount of Ca and Si that adversely affect high-temperature reliability can be controlled to improve high-temperature reliability.

2. Method of Manufacturing Multilayer Ceramic Capacitor

An exemplary method of manufacturing this multilayer ceramic capacitor will now be described.

A dielectric sheet and a conductive paste for the internal electrode are prepared. The dielectric sheet or the conductive paste for the internal electrode includes a binder and a solvent. For example, a known binder and a known solvent can be used.

For preparation of the dielectric sheet, ceramic slurry obtained by dispersing the binder and a dielectric material in the solvent is blended in a blender-disperser and the ceramic slurry is applied to a sheet and dried. The dielectric sheet is thus obtained.

The conductive paste for the internal electrode is then printed in a prescribed pattern on the dielectric sheet, for example, by screen printing or gravure printing. The dielectric sheet with the pattern of the first internal electrode layer formed and the dielectric sheet having the pattern of the second internal electrode layer formed are thus prepared.

In succession, a prescribed number of dielectric sheets for the outer layer where the pattern of the internal electrode layer has not been printed are layered to form a portion to be second main-surface-side outer layer portion 20b on the side of the second main surface. Then, the dielectric sheet having the pattern of the first internal electrode layer printed and the dielectric sheet having the pattern of the second internal electrode layer printed are successively layered on the portion to be second main-surface-side outer layer portion 20b to form a portion to be inner layer portion 18. A prescribed number of dielectric sheets where the pattern of the internal electrode layer has not been printed are further layered on the portion to be inner layer portion 18 to form a portion to be first main-surface-side outer layer portion 20a on the side of the first main surface. A multilayer sheet is thus made.

In order to make the color tone of dielectric layers 14 different between first main-surface-side outer layer portion 20a and second main-surface-side outer layer portion 20b and first side-surface-side outer layer portion 22a and second side-surface-side outer layer portion 22b, all or at least one of (a) a surface area, (b) a firing temperature, and (c) an amount of resin in blending ceramic are/is controlled for the dielectric sheet corresponding to each portion and a multilayer chip which will be described later.

In order to construct multilayer body 12 such that the monotectoid phase is provided in first side-surface-side outer layer portion 22a and second side-surface-side outer layer portion 22b in the WT cross-section defined by stacking direction x and width direction y, for example, the monotectoid phase includes at least one of Ca and Si, and the region where the monotectoid phase is provided is not larger than about 3% of the total area of first side-surface-side outer layer portion 22a and second side-surface-side outer layer portion 22b in the WT cross-section of multilayer body 12, the temperature for firing of the multilayer chip, the number of revolutions of a rotor of the blender-disperser for blending the ceramic slurry, a time period for blending and dispersion, and an amount of the binder in the ceramic slurry are controlled.

The multilayer sheet is then pressed in the stacking direction by, for example, hydrostatic pressing to make a multilayer block.

The multilayer block is then cut into multilayer chips each having a prescribed size. At this time, the corner portion and the ridgeline portion of the multilayer chip may be rounded by barrel polishing.

The multilayer chip is then fired to make the multilayer body. The firing temperature is preferably, for example, not lower than about 900° C. and not higher than about 1400° C., depending on a material for multilayer body 12 or internal electrode layer 16.

In succession, a conductive paste for the first underlying electrode layer including a metallic component and a glass component and a conductive paste for the second underlying electrode layer including a metallic component and a glass component are prepared.

The conductive pastes to be the first underlying electrode layer and the second underlying electrode layer are then applied to both of the end surfaces of multilayer body 12 to form first underlying electrode layer 32a and second underlying electrode layer 32b as the baked layers. For example, the conductive paste is applied to first end surface 12e and second end surface 12f which are the both end surfaces of multilayer body 12, for example, with such a method as dipping or screen printing, and thereafter baking treatment is performed to form first underlying electrode layer 32a and second underlying electrode layer 32b. A temperature in the baking treatment is preferably not lower than 700° C. and not higher than 900° C.

Example of Conductive Resin Layer

When underlying electrode layer 32 is formed from the conductive resin layer, it can be formed in an example method below. The conductive resin layer may be formed on the surface of the baked layer, or the conductive resin layer alone may be formed directly on multilayer body 12 without the baked layer being formed.

For example, the conductive resin layer is formed by applying a conductive resin paste including a thermosetting resin and a metallic component onto the baked layer or multilayer body 12 and performing thermal treatment at a temperature not lower than about 250° C. and not higher than about 550° C. to thermally cure the resin. An atmosphere for this thermal treatment is preferably an $N_2$ atmosphere. In order to prevent scattering of resin and oxidation of various metallic components, a concentration of oxygen is preferably not higher than about 100 ppm.

Example of Thin-Film Layer

When underlying electrode layer 32 is formed from the thin-film layer, the underlying electrode layer can be formed with a thin film formation method such as sputtering or vapor deposition. Underlying electrode layer 32 formed from the thin-film layer is a layer, for example, not larger than about 1 μm that is obtained by deposition of metallic particles.

Example of Plated Layer

A plated layer may be provided on an exposed portion of internal electrode layer 16 of multilayer body 12 without underlying electrode layer 32 being provided. In that case, the plated layer can be formed in an example method below.

First end surface 12e and second end surface 12f of multilayer body 12 are plated to form an underlying plated film on the exposed portion of internal electrode layer 16. Any of electrolytic plating and electroless plating may be used for plating. Electroless plating, however, is disadvantageous in that it is a complicated process because pretreatment with a catalyst or the like is required for improvement in rate of precipitation of plating. Therefore, electrolytic plating is normally preferably used. Barrel plating is preferably used as plating. An upper plated electrode formed on a surface of a lower plated electrode may similarly be formed as necessary.

Then, the surface of each of first underlying electrode layer 32a and second underlying electrode layer 32b is plated as necessary to form plated layer 34. In the present example embodiment, two plated layers 34 are formed on first underlying electrode layer 32a and second underlying electrode layer 32b. Specifically, for example, plated layers 34 including a Ni plated layer and a Sn plated layer are formed on each of first underlying electrode layer 32a and second underlying electrode layer 32b. The Ni plated layer and the Sn plated layer are successively formed, for example, by barrel plating.

Multilayer ceramic capacitor 10 according to the example embodiment of the present invention is obtained as set forth above.

3. Experimental Example

A multilayer ceramic capacitor as a sample was made in accordance with the manufacturing method according to the example embodiment described above and a test for distinguishing a direction in which a chip faced and a high-temperature reliability test were conducted.

(a) Specifications of Sample in Each of Examples and Comparative Examples

Dimension of multilayer ceramic capacitor: L×W×T=about 2.0 mm×about 1.2 mm×about 0.6 mm Ceramic material: $SrBaZrO_3$ Capacitance: about 20 nF Rated voltage: about 100 V Material for internal electrode layer: Ni Structure of external electrode Underlying electrode layer: including conductive metal (Cu) and glass component Thickness at central portion located in first end surface and second end surface: approximately about 130 μm Plated layer: formed from two layers of Ni plated layer and Sn plated layer Thickness of Ni plated layer: about 2.5 μm Thickness of Sn plated layer: about 4 μm In Examples, a value of the difference between the RGB value that reproduced the color tone of the ends in width direction y of the first main-surface-side outer layer portion and the second main-surface-side outer layer portion of the multilayer body and the RGB value that reproduced the color tone of the ends in width direction y of the first side-surface-side outer layer portion and the second side-surface-side outer layer portion was set within a range not smaller than about 45 and not larger than about 100, for example.

In Examples, the monotectoid phase was provided in the first side-surface-side outer layer portion and the second side-surface-side outer layer portion in the WI cross-section defined by stacking direction x and width direction y of the multilayer body, and the monotectoid phase included Ca and Si. The region where the monotectoid phase was arranged was not larger than about 3% of the total area of the first side-surface-side outer layer portion and the second side-surface-side outer layer portion in the WI cross-section of multilayer body 12.

In each of Comparative Example 1 and Comparative Example 4, a value of the difference between the RGB value that reproduced the color tone of the ends in width direction y of the first main-surface-side outer layer portion and the second main-surface-side outer layer portion of the multilayer body and the RGB value that reproduced the color tone of the ends in width direction y of the first side-surface-side outer layer portion and the second side-surface-side outer layer portion was set to be out of the range not smaller than about 45 and not larger than about 100. In Comparative Example 1 and Comparative Example 4, the values of the difference were set to about 10 and about 150, respectively. In each of Comparative Examples 2 and 3, the value of the difference between the RGB value that reproduced the color tone of the ends in width direction y of the first main-surface-side outer layer portion and the second main-surface-side outer layer portion of the multilayer body and the RGB value that reproduced the color tone of the ends in width direction y of the first side-surface-side outer layer portion and the second side-surface-side outer layer portion was set to about 70.

In Comparative Examples, the monotectoid phase was provided in the first side-surface-side outer layer portion and the second side-surface-side outer layer portion in the WT cross-section defined by stacking direction x and width direction y of the multilayer body and the monotectoid phase included Ca and Si. The region where the monotectoid phase was arranged was not smaller than about 3% of the total area of the first side-surface-side outer layer portion and the second side-surface-side outer layer portion in the WT cross-section of multilayer body 12.

(b) Test Method

Test for Distinguishing Direction in which Chip Faces

The RGB value was measured by analysis with image analysis software, of an image (the ends in width direction y of first main-surface-side outer layer portion 20a and second main-surface-side outer layer portion 20b and the ends in width direction y of first side-surface-side outer layer portion 22a and second side-surface-side outer layer portion 22b) observed with a microscope. The orientation of the sample was distinguished by simplified image analysis with the use of an optical microscope.

A sample correctly distinguished by image analysis was determined as "OK" and a sample erroneously distinguished or a sample where a structural defect occurred was determined as "NG". Two thousand samples were tested in each of Examples and Comparative Examples.

High-Temperature Reliability Test

A high-temperature load test was conducted as the high-temperature reliability test for each sample based on the HALT test method. More specifically, each sample alone was set on a dedicated jig and the sample was introduced in a constant temperature bath at a temperature of about 150° C. A direct-current voltage at about 200 V was applied across a pair of external electrodes 30 and this state was maintained for about three thousand hours.

An example where no sample failed during the test was determined as "A", an example where one to five samples failed during the test was determined as "B", and an example where at least six samples failed during the test was determined as "C". Thirty-six samples were tested in each of Examples and Comparative Examples.

(c) Result

Table 1 shows results of measurement of the color tone (RGB value) in the sample in each of Examples 1 to 6 and Comparative Examples 1 to 4 and results of the tests of distinguishability of the chip orientation and high-temperature reliability based on a ratio of the monotectoid phase in the WT cross-section.

TABLE 1

| | Difference in RGB Value | Ratio of Region of Monotectoid Phase (%) | Chip Orientation Distinction Test | High-Temperature Reliability Test | Total Determination |
|---|---|---|---|---|---|
| Example 1 | 45 | 1 | OK | A | Good |
| Example 2 | 45 | 3 | OK | A | Good |
| Example 3 | 69 | 1 | OK | A | Good |
| Example 4 | 69 | 3 | OK | A | Good |
| Example 5 | 100 | 1 | OK | A | Good |
| Example 6 | 100 | 3 | OK | A | Good |
| Comparative Example 1 | 10 | 10 | NG | C | Not Good |
| Comparative Example 2 | 70 | 10 | OK | C | Not Good |
| Comparative Example 3 | 70 | 20 | OK | C | Not Good |
| Comparative Example 4 | 150 | 10 | NG | C | Not Good |

According to Table 1, in the samples in Examples 1 to 6, the difference between the RGB value that reproduced the color tone of the ends in width direction y of the first main-surface-side outer layer portion and the second mainsurface-side outer layer portion of the multilayer body and the RGB value that reproduced the color tone of the ends in width direction y of the first side-surface-side outer layer portion and the second side-surface-side outer layer portion was not smaller than about 45 and not larger than about 100, and thus the orientation of the chip was satisfactorily distinguished. In the samples in Examples 1 to 6, the monotectoid phase was provided in the first side-surface-side outer layer portion and the second side-surface-side outer layer portion in the WT cross-section defined by stacking direction x and width direction y of the multilayer body, the monotectoid phase included Ca and Si, and the region where the monotectoid phase was arranged was not larger than about 3% of the total area of the first side-surface-side outer layer portion and the second side-surface-side outer layer portion in the WT cross-section of multilayer body 12. Therefore, the result of the high-temperature reliability test was also satisfactory.

In the sample in Comparative Example 1, on the other hand, the difference between the RGB value that reproduced the color tone of the ends in width direction y of the first main-surface-side outer layer portion and the second main-surface-side outer layer portion of the multilayer body and the RGB value that reproduced the color tone of the ends in width direction y of the first side-surface-side outer layer portion and the second side-surface-side outer layer portion was about 10, and the orientation of the chip could not be distinguished. In the sample in Comparative Example 1, the monotectoid phase was provided in the first side-surface-side outer layer portion and the second side-surface-side outer layer portion in the WT cross-section defined by stacking direction x and width direction y of the multilayer body, the monotectoid phase included Ca and Si, and the region where the monotectoid phase was arranged was about 10% of the total area of the first side-surface-side outer layer portion and the second side-surface-side outer layer portion in the WI cross-section of multilayer body 12. Therefore, the high-temperature reliability was low and the result of the test was determined as not good.

In the sample in Comparative Example 2, the difference between the RGB value that reproduced the color tone of the ends in width direction y of the first main-surface-side outer layer portion and the second main-surface-side outer layer portion of the multilayer body and the RGB value that reproduced the color tone of the ends in width direction y of the first side-surface-side outer layer portion and the second side-surface-side outer layer portion was about 70. Therefore, the orientation of the chip was satisfactorily distinguished. On the other hand, the monotectoid phase was provided in the first side-surface-side outer layer portion and the second side-surface-side outer layer portion in the WT cross-section defined by stacking direction x and width direction y of the multilayer body, the monotectoid phase included Ca and Si, and the region where the monotectoid phase was arranged was about 10% of the total area of the first side-surface-side outer layer portion and the second side-surface-side outer layer portion in the WT cross-section of multilayer body 12. Therefore, the high-temperature reliability was low and the result of the test was determined as not good.

Furthermore, in the sample in Comparative Example 3, the difference between the RGB value that reproduced the color tone of the ends in width direction y of the first main-surface-side outer layer portion and the second main-surface-side outer layer portion of the multilayer body and the RGB value that reproduced the color tone of the ends in width direction y of the first side-surface-side outer layer portion and the second side-surface-side outer layer portion was about 70. Therefore, the orientation of the chip was satisfactorily distinguished. On the other hand, the monotectoid phase was provided in the first side-surface-side outer layer portion and the second side-surface-side outer layer portion in the WT cross-section defined by stacking direction x and width direction y of the multilayer body, the monotectoid phase included Ca and Si, and the region where the monotectoid phase was arranged was about 20% of the total area of the first side-surface-side outer layer portion and the second side-surface-side outer layer portion in the WT cross-section of multilayer body 12. Therefore, the high-temperature reliability was low and the result of the test was determined as not good.

Furthermore, in the sample in Comparative Example 4, the difference between the RGB value that reproduced the color tone of the ends in width direction y of the first main-surface-side outer layer portion and the second main-surface-side outer layer portion of the multilayer body and the RGB value that reproduced the color tone of the ends in width direction y of the first side-surface-side outer layer portion and the second side-surface-side outer layer portion was about 150. Therefore, a difference in shrinkage occurred during firing at the ends in the width direction of the first and second main-surface-side outer layer portions and the ends in the width direction of the first and second side-surface-side outer layer portions, and consequently the structural defect occurred. In the sample in Comparative Example 4, the monotectoid phase was provided in the first side-surface-side outer layer portion and the second side-surface-side outer layer portion in the WT cross-section defined by stacking direction x and width direction y of the multilayer body, the monotectoid phase included Ca and Si, and the region where the monotectoid phase was arranged was about 10% of the total area of the first side-surface-side outer layer portion and the second side-surface-side outer layer portion in the WT cross-section of multilayer body 12. Therefore, the high-temperature reliability was low and the result of the test was determined as not good.

From the results above, for example, by setting the difference between the RGB value that reproduced the color tone of the ends in width direction y of the first main-surface-side outer layer portion and the second main-surface-side outer layer portion of the multilayer body and the RGB value that reproduced the color tone of the ends in width direction y of the first side-surface-side outer layer portion and the second side-surface-side outer layer portion to be not smaller than about 45 and not larger than about 100, distinction between the main surface and the side surface could be facilitated, the orientation of the multilayer ceramic capacitor could be distinguished, an appearance-based screening or designation of the direction in mount could be made, and an appearance-based screening or mount could be more efficient. By providing the monotectoid phase in the first side-surface-side outer layer portion and the second side-surface-side outer layer portion in the WT cross-section defined by stacking direction x and width direction y of the multilayer body, the monotectoid phase including Ca and Si, and controlling the amount of Ca and Si that adversely affected high-temperature reliability to set the region where the monotectoid phase was provided to about 3% or less of the total area of the first side-surface-side outer layer portion and the second side-surface-side outer layer portion in the WT cross-section of multilayer body 12, the effect to improve high-temperature reliability was obtained.

Although example embodiments of the present invention are disclosed as above in the description, the present invention is not limited thereto.

In other words, the example embodiments described above can variously be modified in mechanism, shape, material, number or amount, position, or arrangement without departure from the scope of the technical concept and the object of the present invention, and the modifications are encompassed in the present invention.

Although example embodiments of the present invention have been described, it should be understood that the example embodiments disclosed herein are illustrative and non-restrictive in every respect. The scope of the present invention is defined by the terms of the claims and is intended to include any modifications within the scope and meaning equivalent to the terms of the claims.

What is claimed is:

1. A multilayer ceramic capacitor comprising:
   a multilayer body including a plurality of dielectric layers that are stacked in a stacking direction and a plurality of internal electrode layers on the dielectric layers, the multilayer body being provided with a first main surface and a second main surface opposed to each other in a stacking direction, a first side surface and a second side surface opposed to each other in a width direction orthogonal to the stacking direction, and a first end surface and a second end surface opposed to each other in a length direction orthogonal to the stacking direction and the width direction;
   a first external electrode on the first end surface; and
   a second external electrode on the second end surface; wherein
   the multilayer body includes:
      an inner layer portion in which the dielectric layers and the internal electrode layers are alternately stacked;
      a first main-surface-side outer layer portion and a second main-surface-side outer layer portion sandwiching the inner layer portion from a side of the first main surface and a side of the second main surface; and
      a first side-surface-side outer layer portion and a second side-surface-side outer layer portion sandwiching the inner layer portion from a side of the first side surface and a side of the second side surface;
   a difference between an RGB value that reproduces a color tone of ends in the width direction of the first main-surface-side outer layer portion and the second main-surface-side outer layer portion and an RGB value that reproduces a color tone of ends in the width direction of the first side-surface-side outer layer portion and the second side-surface-side outer layer portion is not smaller than about 45 and not larger than about 100;
   the dielectric layers includes-a dielectric material;
   a monotectoid phase is provided in the first side-surface-side outer layer portion and the second side-surface-side outer layer portion in a WT cross-section defined by the stacking direction and the width direction of the multilayer body:
   the monotectoid phase includes at least one of Ca and Si; and
   a region where the monotectoid phase is provided is not larger than about 3% of a total area of the first side-surface-side outer layer portion and the second side-surface-side outer layer portion in the WT cross-section of the multilayer body.

2. The multilayer ceramic capacitor according to claim 1, wherein the dielectric material in the dielectric layers has a perovskite structure including Zr and Ca.

3. The multilayer ceramic capacitor according to claim 2, wherein the perovskite structure of the dielectric material is $SrBaZrO_3$.

4. The multilayer ceramic capacitor according to claim 1, wherein the multilayer body includes has a parallelepiped shape.

5. The multilayer ceramic capacitor according to claim 1, wherein each of the plurality of internal electrode layers includes at least one of Ni, Cu, Ag, Pd, or Au or an alloy including at least one of Ni, Cu, Ag, Pd, or Au.

6. The multilayer ceramic capacitor according to claim 1, wherein each of the first and second external electrodes includes an underlying electrode layer.

7. The multilayer ceramic capacitor according to claim 6, wherein the underlying electrode layer includes a first underlying electrode layer and a second underlying electrode layer.

8. The multilayer ceramic capacitor according to claim 6, wherein the underlying electrode layer is a baked layer.

9. The multilayer ceramic capacitor according to claim 8, wherein the baked layer includes glass and metal.

10. The multilayer ceramic capacitor according to claim 9, wherein the glass includes at least one of B, Si, Ba, Sr, Ca, Mg, Al, Ti, Zr, K, Na, or L.

11. The multilayer ceramic capacitor according to claim 9, wherein the, the metal includes at least one of Cu, Ni, Ag, Pd, an Ag—Pd alloy, or Au.

12. The multilayer ceramic capacitor according to claim 8, wherein the baked layer has a thickness of not smaller than about 10 μm and not larger than about 150 μm.

13. The multilayer ceramic capacitor according to claim 8, wherein the underlying electrode layer is a conductive resin layer.

14. The multilayer ceramic capacitor according to claim 13, wherein the conductive resin layer includes a first conductive resin layer and a second conductive resin layer.

15. The multilayer ceramic capacitor according to claim 14, wherein the first conductive resin layer and the second conductive resin layer each have a thickness of not smaller than about 10 μm and not larger than about 200 μm.

16. The multilayer ceramic capacitor according to claim 14, wherein the first conductive resin layer and the second conductive resin layer each include a thermosetting resin and a metallic component.

* * * * *